Nov. 20, 1934. F. R. WHITE 1,981,442
HELICOPTER
Original Filed July 15, 1931 6 Sheets-Sheet 1
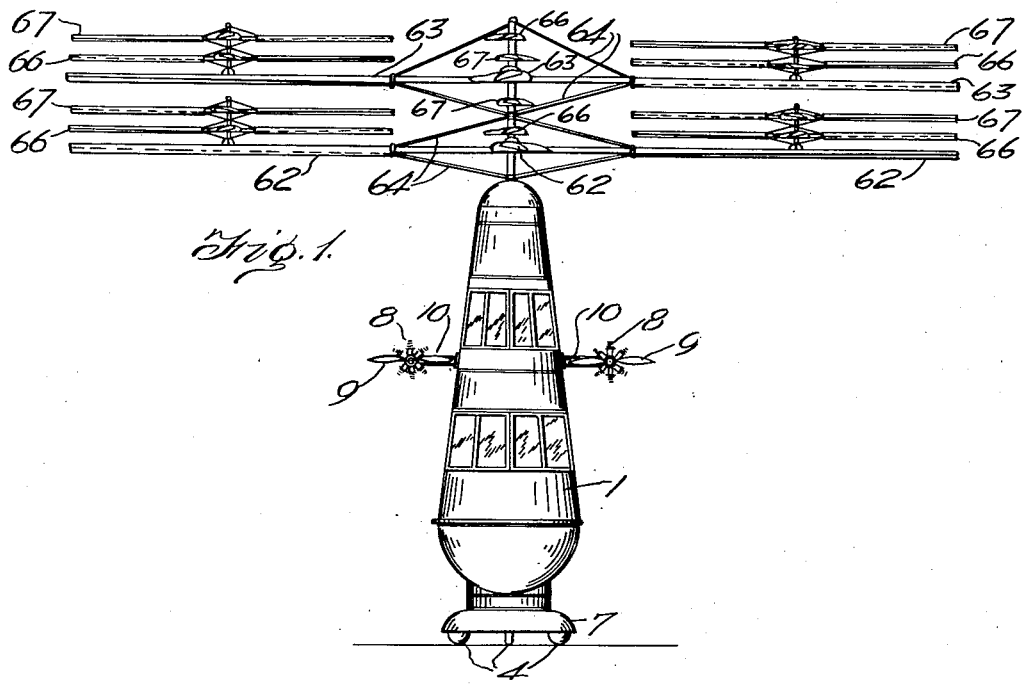
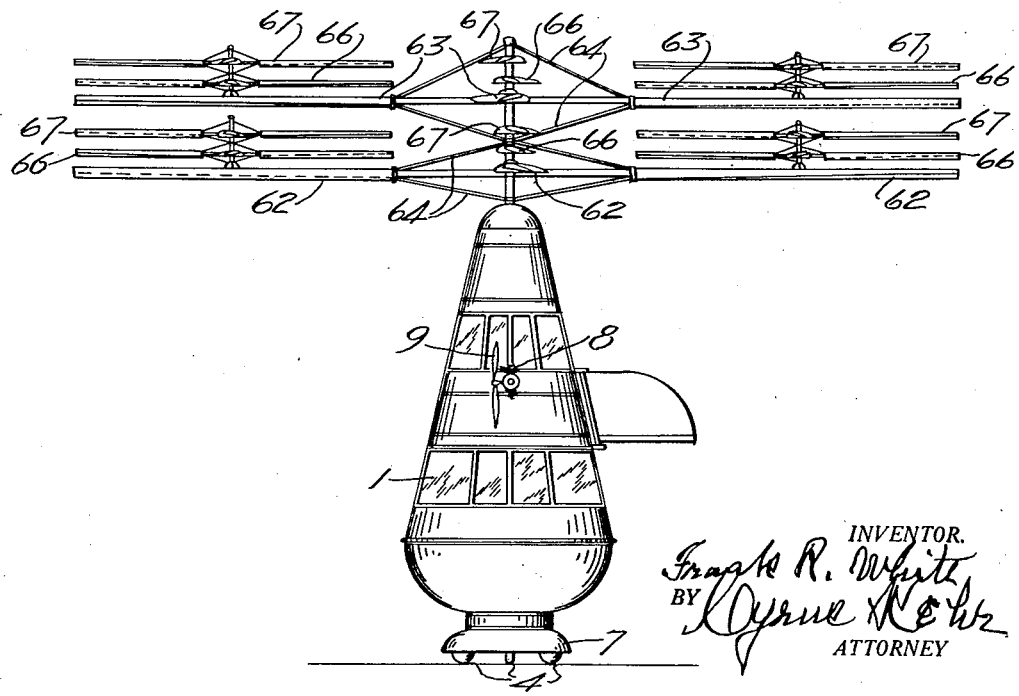

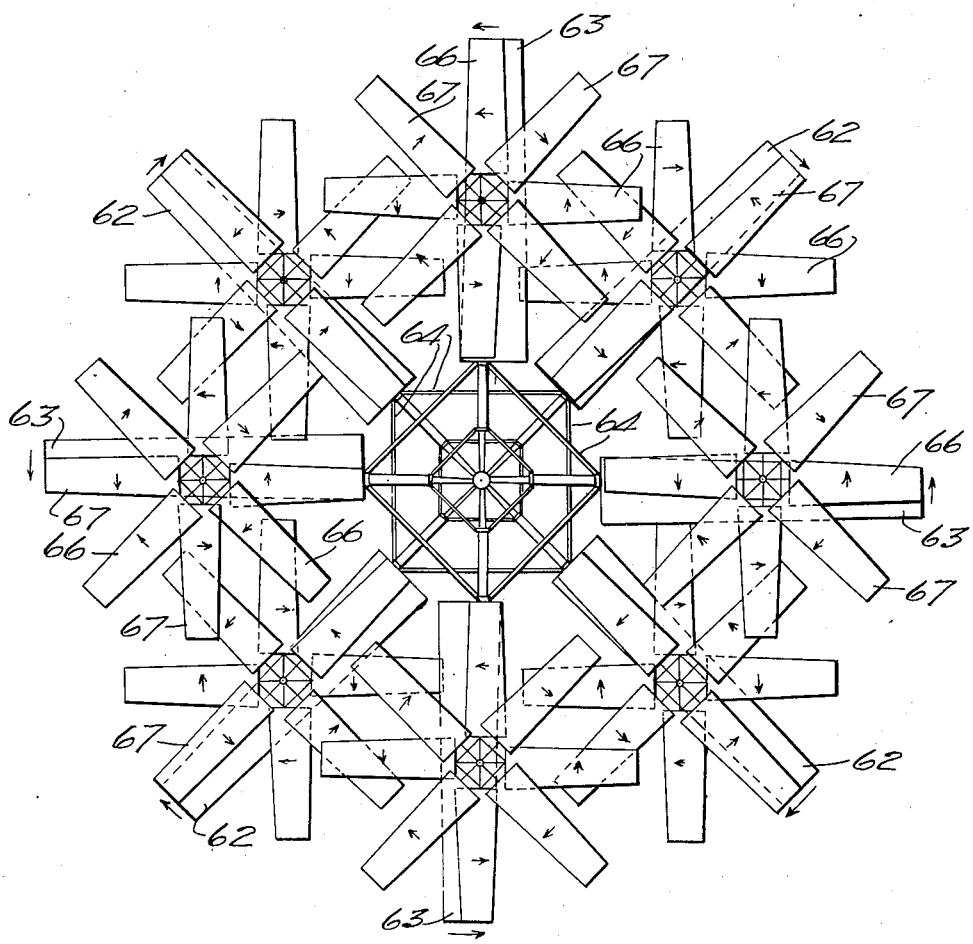

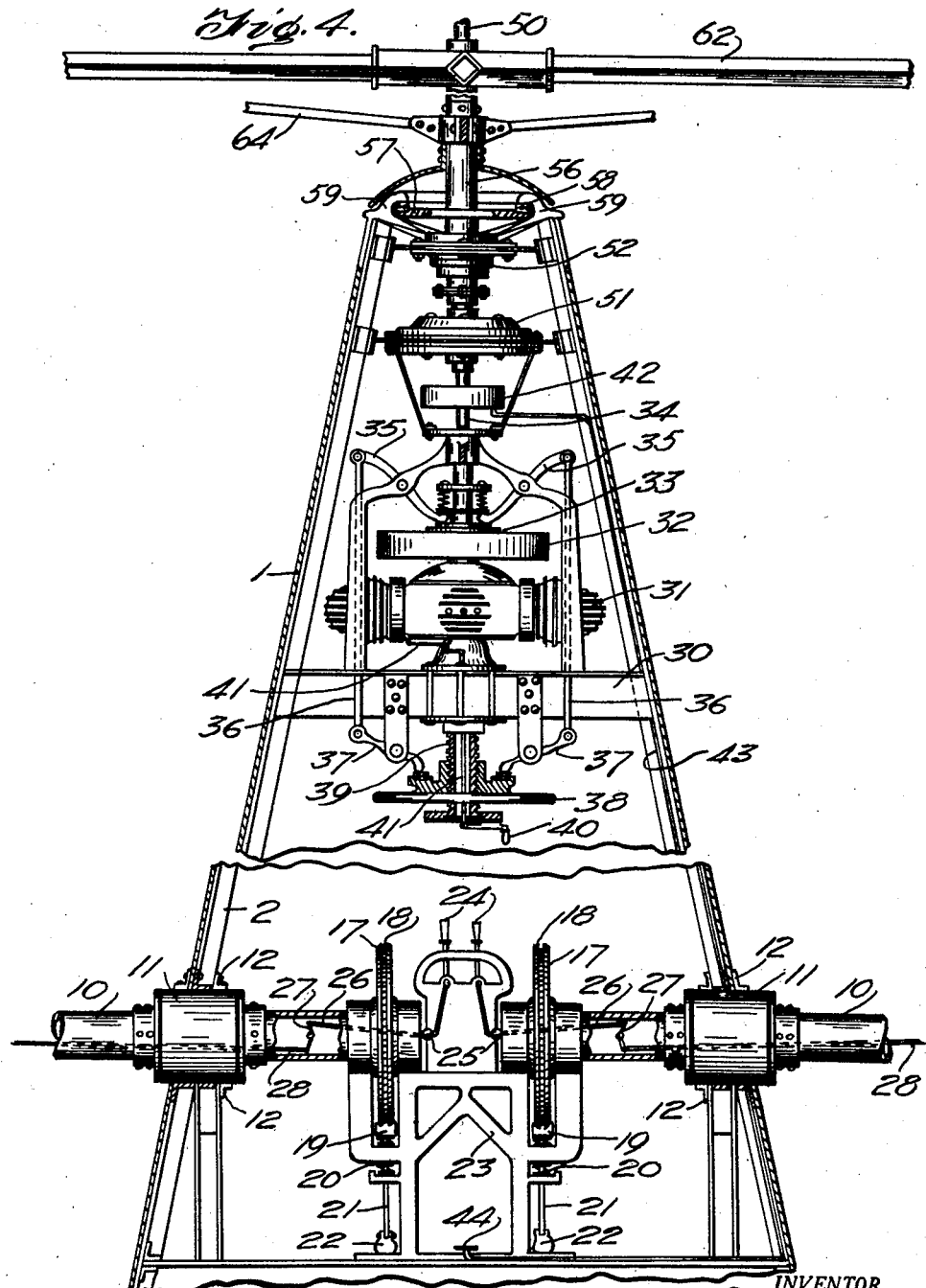

Nov. 20, 1934.　　　F. R. WHITE　　　1,981,442
HELICOPTER
Original Filed July 15, 1931　　6 Sheets-Sheet 4

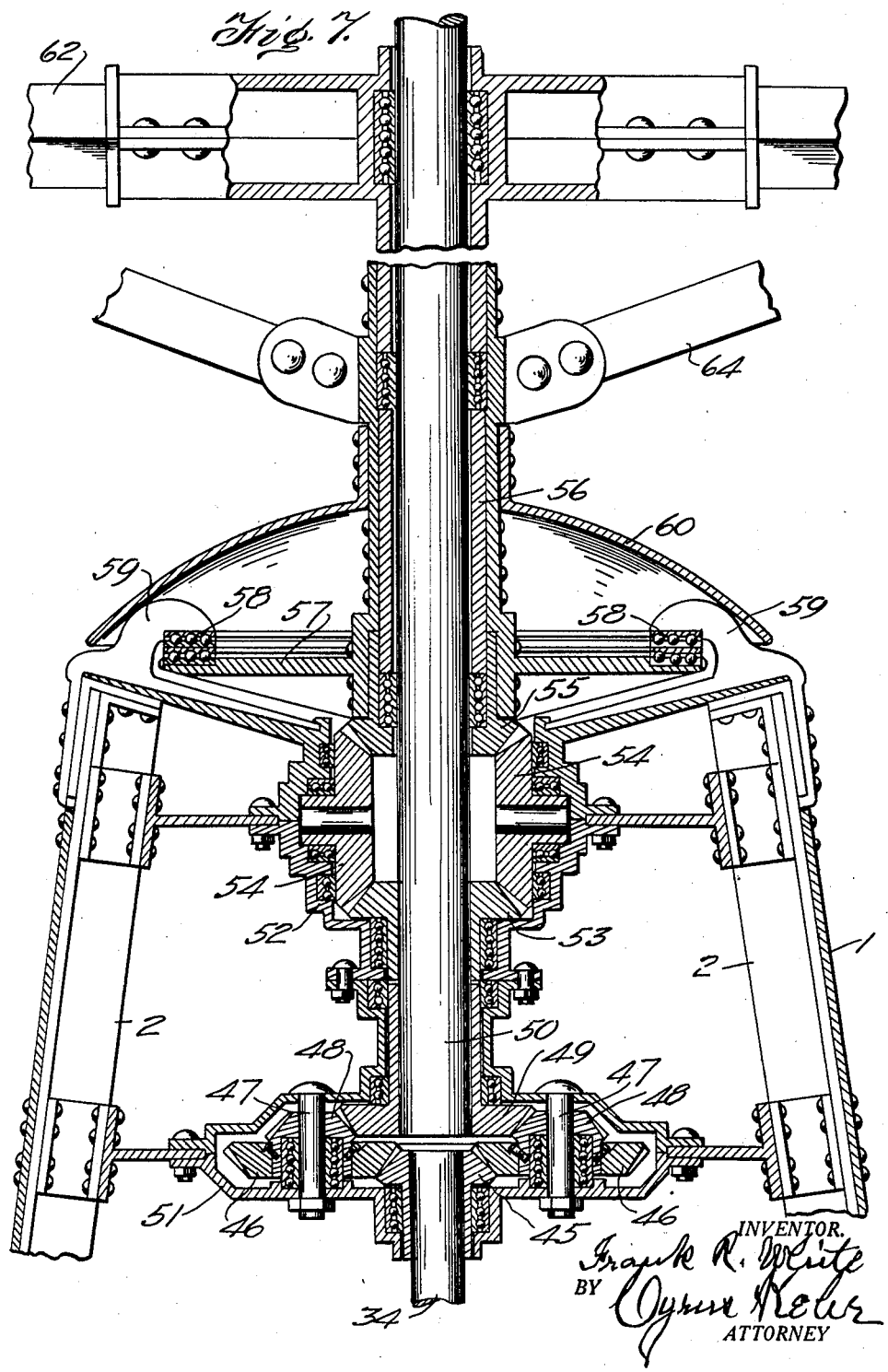

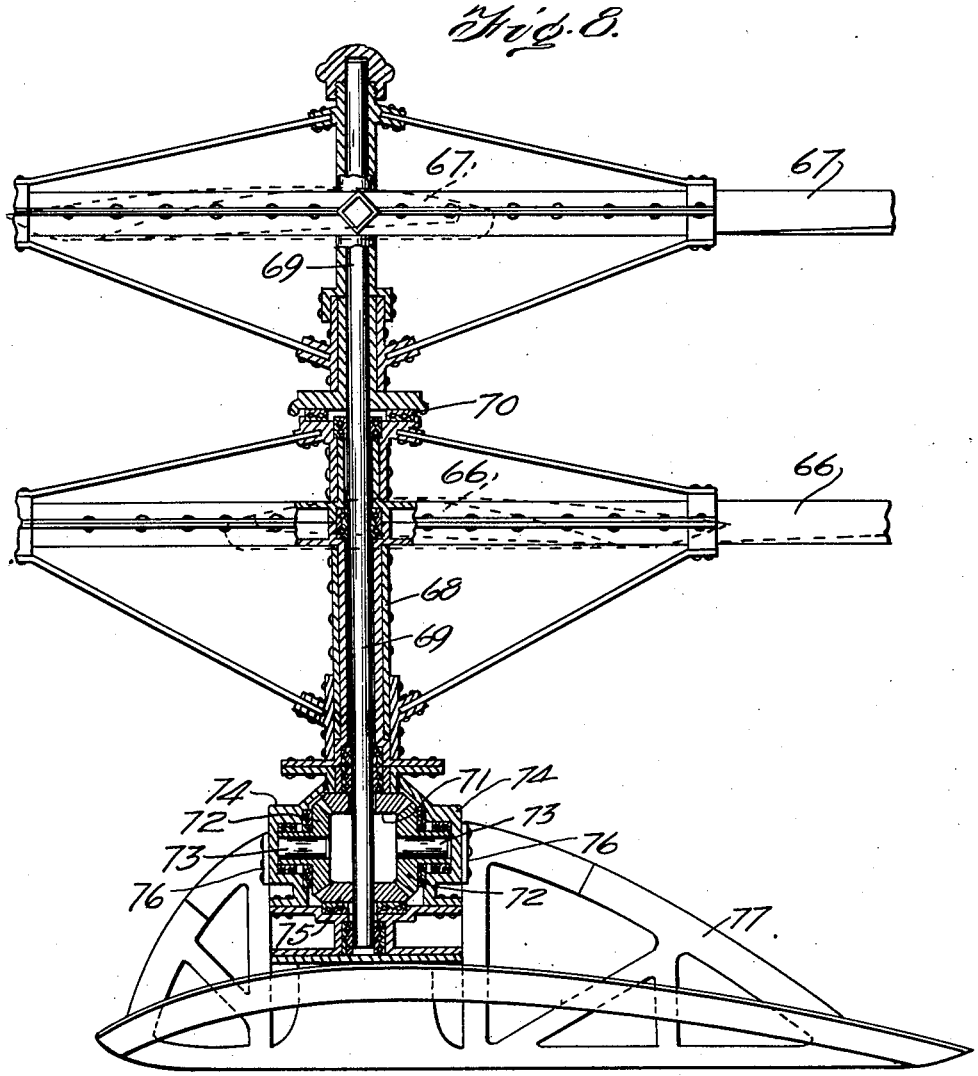

Patented Nov. 20, 1934

1,981,442

UNITED STATES PATENT OFFICE 1,981,442

HELICOPTER

Frank Russell White, Glenn Dale, Md.

Application July 15, 1931, Serial No. 551,019
Renewed April 16, 1934

19 Claims. (Cl. 244—19)

This invention relates to an improvement in helicopters.

The object of the invention is to provide a vertically rising and descending flying ship capable of hovering over a given point at any desired altitude within the power of the motors and able to rotate while in such position, without changing its altitude or point of location, and also able to leave its position in any desired lateral direction. The entire ship is suspended and its weight perfectly centered from the suspension point by one shaft, running to a series of motor driven wings having a rotary motion, the wings of each series rotating in opposite directions at the same speed.

Each main rotary wing is provided with a set of subsidiary rotary wings, operating in opposite directions at the same speed. These subsidiary revolving wings are provided for the purpose of accurately distributing the weight which would normally come to each of the main wings to which they are attached, thereby diminishing the strain and increasing their efficiency. These subsidiary wings are termed "boostercopters".

The main rotary wings and boostercopters are of sufficient wing-area so that in the event of motor failure and the disconnection of the driving motor from the shaft to the main wings, the weight of the entire ship will descend gently at a desired predetermined speed, permitting a safe landing of the ship without mishap.

Due to their extreme efficiency at moderate speed, the boostercopters permit of an extremely slow rate of rotation of the main wings, which permits the use of a smaller motor geared down, as for example where a 420 horsepower motor would be required to raise this ship at rapid rotation without the boostercopters, a 60 horsepower motor would be sufficient with the boostercopters, resulting in considerable saving from an installation and operating standpoint.

The same efficiency applies to the two driving motors. Two motors, which may be used to pull this type of ship through the air at the required speed, to maintain it, would necessarily be of much greater horsepower than is required with the present invention, as the motor driven main wings and boostercopters take care of the weight of the entire body, leaving the driving motors to overcome the wind pressure which the present type of ship encounters in addition to the drag.

Provision is also made for controlling the descent of the ship by the use of a brake applied to the main wings to control the rotation thereof, as when the motor has been stopped, or disconnected from the main wings.

In the accompanying drawings:

Fig. 1 is a front elevation of a helicopter embodying my present invention;

Fig. 2 is a side elevation of the same;

Fig. 3 is a top plan view thereof;

Fig. 4 is a vertical sectional view through the upper portion of the ship, showing the controls therefor;

Fig. 7 is a sectional view through the upper portion of the body, showing the gearing for driving the main wings; and Fig. 8 is a sectional view through the shaft and gear arrangement for the boostercopters.

Figure 5:
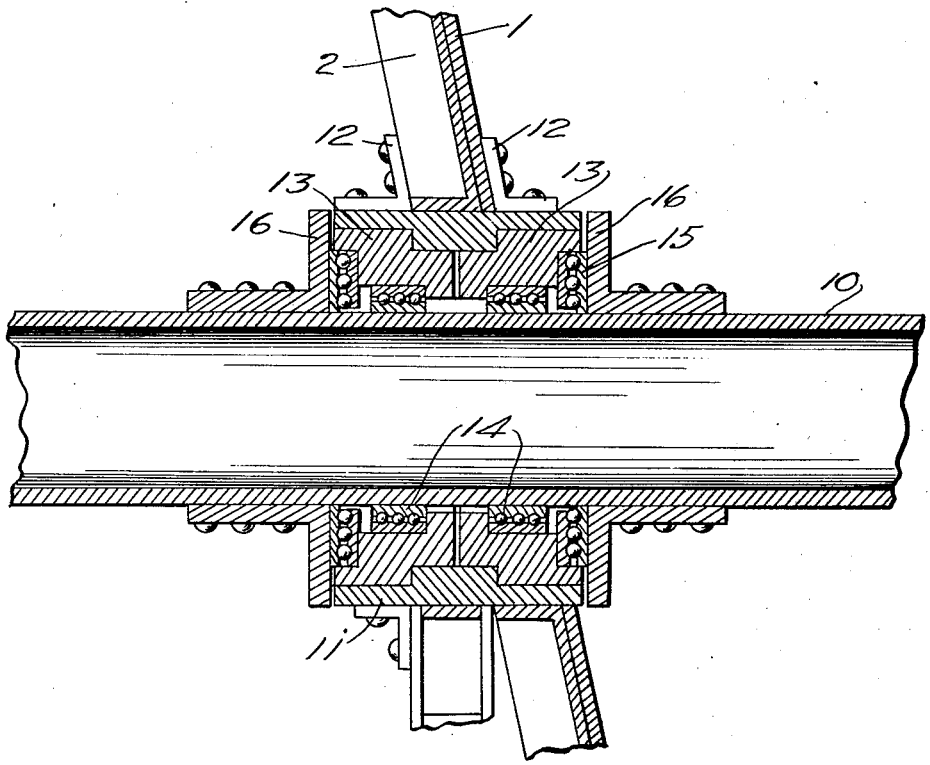
Fig. 5 is a detail vertical section through the bearing for the motor supporting tube.
Figure 6:
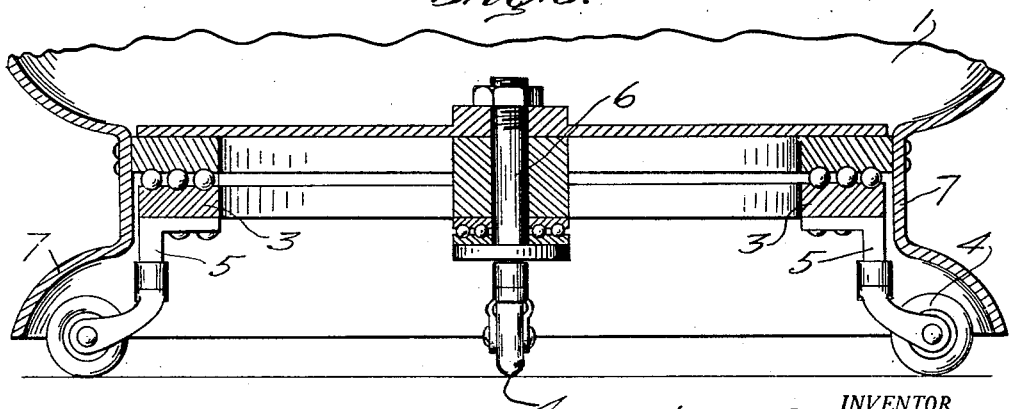
Fig. 6 is a similar view through the turntable which supports the body on the ground.

The numeral 1 designates the body of the ship as a whole and, as shown in Figs. 1 and 2, the body is generally of pear shape, embraced on the inner sides by T-irons 2, which extend vertically and are arranged around the inner side and secured to the walls thereof. The body 1 has a turntable 3 at the lower end thereof to support the same on rollers 4, which are connected with the turntable to support the ship on the ground and to permit the body portion 1 to turn. The rollers 4 are journaled on pins 5, which depend from the turntable 3. A king-pin 6 is provided at the center of the turntable 3. A hood 7 extends downward over the rollers 4 to protect the same. Driving motors 8 are provided at opposite sides of the body 1 to drive propellers 9 connected therewith, and these driving motors are supported by tubular supports 10, which extend laterally through opposite sides of the body portion 1, as shown in Figs. 4 and 5.

The bearing for each of the tubular supports 10 is shown in Fig. 5 and has a casing 11 secured by brackets 12 in the side of the body 1. Castings 13 are fitted into the casing 11 and receive bearings 14 which support the tubular support 10. Thrust-bearings 15 are provided in the outer sides of the castings 13 and are interposed between said castings and flanges 15 secured to the periphery of the tubular support 10. This forms an anti-friction bearing for supporting each of the tubular supports and the motor carried thereby in the frame of the ship, to permit easy turning thereof.

The inner end of each of the tubular supports 10 is connected with a hand-wheel 17, shown in Fig. 4, which hand-wheel is provided with peripheral teeth 18 to be engaged by a segment 19 normally pressed into contact with the teeth 18 by a spring 20. A rod 21 is connected with the segment 19 and with a foot-pedal 22 for releasing the segment 19 from the teeth 18 to permit the hand-wheel to be turned normally. The engagement of the segment 19 with the teeth 18 prevents rotation of the hand-wheel and holds the motors 8 in set positions, but they may be turned to other positions by the hand-wheel for driving the propellers in different directions.

The inner ends of the tubular supports 10 are journaled in a frame 23, which also supports the throttle levers 24, having ball joints 25 for connecting the same with rods 26 pivoted to bell-crank levers 27 within the tubular supports 10. The other ends of the bell-crank levers 27 are connected with rods 28 leading to the throttles of the motors 8 for controlling the operation of these motors.

The ball and socket joints 25 are located on the axes of the tubular supports 10, so that rotation of the tubular supports does not disturb the connection of the throttle levers 24 with the linkage for operating the throttles.

Mounted on a support 30 in the upper portion of the body 1 is a driving motor 31, the crank-shaft of which is provided with a friction clutch element 32 adapted to be engaged by a clutch element 33, slidably keyed to a driving shaft 34. The clutch element 33 is adapted to be moved into frictional engagement with the clutch element 32 by means of levers 35, the outer ends of which are connected by rods 36 with actuating levers 37. The levers 37 are designed to be moved by a hand-wheel 38 threaded onto a shaft 39, so that rotation of the hand-wheel on the shaft causes a swinging movement of the levers 37 and of the levers 35 to move the clutch element 33 into or out of frictional engagement with the clutch element 30 and connect or disconnect the driving motor 31 with the driving shaft 34. A throttle lever 40 is provided for the motor 31 and is connected with the throttle thereof through rods 41.

A brake is designated generally by the numeral 42 and is controlled in a suitable well known manner through a tube 43, leading to a foot pedal 44, as shown in Fig. 4.

Referring to Fig. 7, the upper end of the drive shaft 34 has a bevelled pinion 45 fixed thereto, meshing with bevel gears 46 on opposite sides thereof and journaled on pins 47. Bevel pinions 48 are fixed to the bevel gears 46 and mesh with a bevel gear 49 fixed to a shaft 50.

The bevel gearing 45—49 reduces the speed between the shafts 34 and 50 in a ratio of approximately 7 to 1, as shown, although this may be varied as found desirable. This gearing is enclosed within a housing 51 secured within and to the reinforcing bars 2, and a second gear housing 52 is similarly mounted above the gear housing 51 and is connected therewith.

A gear 53 is fixed to the shaft 50 within the housing 52 and meshes with idle gears 54 journaled within the housing 52. The opposite sides of these idle gears 54 mesh with a gear 55 fixed to a shaft 56 surrounding and slightly spaced from the shaft 50. A flange 57 projects laterally from the shaft 56 and carries anti-friction bearings 58 on the upper side thereof, which engage under hook-shaped brackets 59 fixed to the upper ends of the reinforcing bars 2 to cause a lifting action of the body 1 from the upright shafts. A hood 60 projects laterally from the tubular shaft 56 and encloses the top of the body.

Two sets of main rotating wings 62 and 63 are provided, as shown in Figs. 1 and 2. These main wings 62 and 63 are superimposed and are adapted for rotation in opposite directions. The wings 62 are secured to the upper ends of the tubular shaft 56, while the wings 63 are secured to the upper end of the shaft 50. Braces 64 are provided for these wings, as shown particularly in Figs. 1 and 2.

Each of the main wings 62 and 63 supports boostercopter wings 66 and 67, which are similar in structure to the main wings and are arranged in superimposed relation and for rotation in opposite directions. The support for the boostercopter wings is shown in detail in Fig. 8. The set of wings 66 is mounted upon a sectional tubular shaft 68, to which a shaft 69 extends and supports the set of wings 67. These shafts are telescopically arranged and are slightly spaced apart, a thrust-bearing 70 being provided at the upper end of the shaft 68.

The lower end of the tubular shaft 68 is secured to the gear 71, meshing with idle gears 72 journaled on pins 73 fixed in a housing 74. Idle gears 72 also mesh with a gear 75 fixed to the lower end of the shaft 69. The housing 74 is supported by brackets 76 on one of the main wings and a hood 77 extends over this structure, as shown in Fig. 8.

In the operation of the ship, the motor 31 drives the main rotary wings 62 and 63 through the gearing shown in Fig. 7, which connects the drive-shaft 34 with the shafts 50 and 56, to drive the latter in opposite directions. The rotation of these main wings sets in motion the boostercopter wings 66 and 67 mounted thereon, which boostercopter wings are, however, not driven by power and their rotation is caused by air contact only, which may be caused by the rotation of the main wings.

The lower rear edge of each of the main wings is curved upward slightly to give a forward rotation to the main wings when the ship is coming straight down.

The use of the boostercopter wings on the main wings greatly increases the effective surface to increase the lift with substantially smaller power, which permits the use of the single motor 31 for rotating the wings and creating sufficient lift to raise the ship off of the ground.

The rotating wings cause the ship to rise vertically from its position on the ground without requiring any forward motion, and after the ship has been elevated to the desired height, the motors 8 may be started or increased in speed to propel the ship forwardly or turned upward to increase the efficiency of the lift. By reason of the support for the motors 8 on the tubular supports 10, said motors may be turned at an angle to the positions shown in Figs. 1 and 2, or one motor turned to a reverse position relative to the other for bodily rotating the entire ship. By inclining the motors slightly, the ship may be given a gradual lift caused by these motors. When it is desired to descend, the motors 8 may be turned off entirely or swung to an upright position while the motor 31 is turned off and the brake 42 applied, to decrease the rotation of the main wings 62 and 63 and the boostercopter wings carried thereby, and just before the ship touches the ground a speeding up of the motors 8 in an upright position, or a similar operation of the motor 31, will cause gradual settling down of the ship on the surface of the ground.

I claim as my invention:

1. A helicopter comprising main wings, means for rotating the main wings, and boostercopter wings mounted on the main wings.

2. A helicopter comprising main rotatable wings, means for rotating said main wings, and freely rotatable boostercopter wings mounted on the main wings.

3. A helicopter comprising rotatable main wings, power driven means for rotating the main wings, and freely rotatable boostercopter wings mounted on the main wings and adapted to be driven only by air contact.

4. A helicopter comprising superimposed sets of main rotatable wings, power means for causing rotation of said main wings in opposite directions, and boostercopter wings mounted on the main wings and adapted to be driven by air contact only.

5. A helicopter comprising superimposed sets of rotatable main wings, power means for driving the main wings in opposite directions, and sets of superimposed boostercopter wings mounted for rotation in opposite directions on a plurality of main wings and freely rotatable by air contact only.

6. A helicopter comprising rotatable main wings, power means for driving the main wings, and sets of superimposed boostercopter wings mounted on each of the main wings, and means for connecting the boostercopter wings together for rotation in opposite directions.

7. A helicopter comprising rotatable main wings, power means for driving the main wings, sets of superimposed sets of boostercopter wings mounted on each of the main wings, and means for connecting the boostercopter wings together for rotation in opposite directions, said boostercopter wings being freely rotatable and adapted to be driven by air contact only primarily upon the rotation of the main wings.

8. A helicopter comprising rotatable main wings, power means for rotating the main wings, sets of superimposed sets of boostercopter wings mounted on each of the main wings, telescoping shafts supporting the sets of boostercopter wings, and gearing connecting the shafts together for rotation at the same speed in opposite directions.

9. A helicopter comprising rotatable main wings, power means for rotating the main wings, sets of superimposed boostercopter wings mounted on each of the main wings, telescoping shafts supporting the sets of boostercopter wings, and gearing connecting the shafts together for rotation at the same speed in opposite directions, said shafts being freely rotatable upon air contact with the boostercopter wings primarily by rotation of the main wings.

10. In an airship, the combination of a plurality of superimposed rotatable wings, boostercopter wings mounted on the main wings for free rotation thereon, power means for driving the main wings in opposite directions, means for disconnecting the source of power from the wings, and a brake arranged to apply braking force jointly to both superimposed wings after disconnection of the power therefrom for reducing the rotation of the wings upon disconnection of the source of power therewith and allowing free rotation of the boostercopter wings.

11. A helicopter comprising a body portion, brackets connected therewith, one or more rotatable wings, power means for rotating the wings, a shaft for the wings, and means connecting the shaft with the brackets and having an upward-thrust-resisting bearing.

12. A helicopter comprising a body, one or more brackets connected therewith, one or more rotatable wings, a shaft connected with the wings, a source of power for driving the wings, means carried by the shaft engaging under the bracket and having an operative connection therewith for lifting the body.

13. A helicopter comprising a body, upright reinforcing members connected therewith, one or more inwardly projecting hook-shaped brackets fixed to the reinforcing members, main wings, a shaft connected therewith, power means for driving the shaft, and a flange fixed to the shaft and extending laterally therefrom beneath the hook-shaped brackets for applying lifting action thereto.

14. An airship comprising a body portion, a motor, a tubular support for the motor, a journal for the tubular support permitting turning thereof, a throttle lever, means extending through the tubular support to the motor for controlling the action thereof, and a universal connection located on the axis of the tubular support for connecting said means with the throttle lever.

15. In an airship, a set of rotary main wings, means for causing rotation of said wings, and one or more sets of boostercopter wings mounted on the main wings and adapted for rotation by air contact upon rotation of the main wings.

16. A helicopter comprising a pair of main wings, means for rotating said main wings, and freely rotatable boostercopter wings carried by the main wings and adapted to be driven by air contact.

17. A helicopter comprising a pair of superposed main rotatable wings, power means for causing rotation of said main wings in opposite directions, and boostercopter wings carried by the main wings and adapted to be driven by air contact.

18. A helicopter comprising a body portion, an upward-thrust resisting bearing carried thereby, a rotatable wing, a shaft for said wing, power means for rotating said shaft, and thrust means connected with the shaft and bearing against the under side of the thrust resisting bearing.

19. A helicopter comprising a body, one or more brackets connected therewith, a rotatable wing, a shaft connected with the wing, and means carried by the shaft engaging under the bracket and having an operative connection therewith for lifting the body.

FRANK RUSSELL WHITE.